United States Patent
Boyapalle et al.

(10) Patent No.: US 12,223,361 B2
(45) Date of Patent: Feb. 11, 2025

(54) SYSTEMS AND METHODS TO TRIGGER WORKLOAD MIGRATION BETWEEN CLOUD-BASED RESOURCES AND LOCAL RESOURCES

(71) Applicant: DELL PRODUCTS L.P., Round Rock, TX (US)

(72) Inventors: Anantha K. Boyapalle, Cedar Park, TX (US); Vivek V. Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 791 days.

(21) Appl. No.: 17/391,935

(22) Filed: Aug. 2, 2021

(65) Prior Publication Data
US 2023/0031998 A1   Feb. 2, 2023

(51) Int. Cl.
*G06F 9/50* (2006.01)

(52) U.S. Cl.
CPC .................. *G06F 9/505* (2013.01)

(58) Field of Classification Search
CPC ............. G06F 9/505; G06F 2209/5019; G06F 2209/5022; G06F 9/4856; G06Q 30/04
See application file for complete search history.

(56) References Cited

U.S. PATENT DOCUMENTS

| | | | |
|---|---|---|---|
| 9,563,479 B2 * | 2/2017 | Ferris | G06F 9/5072 |
| 2013/0198373 A1 * | 8/2013 | Zalmanovitch | H04W 8/186 |
| | | | 709/224 |
| 2013/0212129 A1 * | 8/2013 | Lawson | G05B 11/01 |
| | | | 707/779 |
| 2017/0060628 A1 * | 3/2017 | Tarasuk-Levin | H04L 63/0209 |
| 2019/0227949 A1 * | 7/2019 | Bernat | G06F 11/3476 |
| 2019/0342797 A1 * | 11/2019 | Fu | H04W 36/22 |
| 2020/0212677 A1 * | 7/2020 | Wolkoff | G06Q 50/06 |
| 2022/0036272 A1 * | 2/2022 | Karimi | G06N 5/027 |

OTHER PUBLICATIONS

Amazon, "Amazon CloudWatch—Application and Infrastructure Monitoring", Captured from Internet Jul. 29, 2021, 4 pgs.
Amazon, Amazon CloudWatch Product Features—Amazon Web Services (AWS), Captured from Internet Jul. 22, 2021, 11 pgs.
Microsoft Docs, Introduction to Cloud Service (Classic) Monitoring, Captured from Internet May 7, 2021, 5 pgs.

* cited by examiner

*Primary Examiner* — Jorge A Chu Joy-Davila
(74) *Attorney, Agent, or Firm* — Egan, Enders & Huston LLP

(57) ABSTRACT

Embodiments of systems and methods are provided to trigger migration of a workload from cloud-based resources to local resources, or vice versa. In the disclosed embodiments, an orchestration service receives telemetry data from a client system associated with a user and cloud resource usage data corresponding to the user from a plurality of cloud service providers. Before the end of each cloud computing service billing cycle, the orchestration service: uses the cloud resource usage data and/or the telemetry data to determine a cloud resource usage, which is expected for the user at the end of the cloud computing service billing cycle; generates a trigger to migrate the user's workload from cloud-based resources to local resources, or vice versa, based on the expected cloud resource usage; and initiates migration of the user's workload if a trigger is generated. As such, the orchestration service can be used to effectively manage per-user cloud resource costs.

28 Claims, 5 Drawing Sheets

SYSTEMS AND METHODS TO TRIGGER WORKLOAD MIGRATION BETWEEN CLOUD-BASED RESOURCES AND LOCAL RESOURCES

FIELD

This invention relates generally to information handling systems and, more particularly, to management of workloads executed locally on a client system or remotely on a remote server operated by a cloud service provider.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cloud service providers provide cloud computing services and resources to organizations and users. Examples of cloud computing services include Software-as-a-Service (SaaS, a software delivery model where a provider centrally hosts an application that users access over the internet), Platform-as-a-Service (PaaS, a platform delivery model accessed over the internet where a provider provides both the hardware and software generally to application developers), and Infrastructure-as-a-Service (IaaS, an infrastructure delivery model where a vendor provides compute resources, from virtualized servers to storage and network equipment, over the internet).

Cloud service deployment models can generally be described as public, private or hybrid. Public cloud services are delivered by third-party cloud service providers and are broadly available to multiple organizations and users. Examples of public cloud service providers include, but are not limited to, Amazon Web Services (AWS), Microsoft Azure and Google Cloud Platform (GCP). A private cloud service provider limits services to a single organization. Its infrastructure can be built and maintained by the organization, a third party or a combination of the two. Organizations can also use both public and private clouds, called a hybrid cloud, where workloads and data are shared between the clouds.

A workload generally includes applications and services that are executed to perform various tasks for a user. For example, a user's workload may include various user applications, as well as storage, backend services, and associated policies and security needed to run the user applications. As part of the modern client experience, a user can utilize local ("endpoint-native") and cloud-based ("cloud-native") resources to run a workload on either a local machine (e.g., a client or endpoint device), or on a remote server or cloud instance (a virtual machine or virtual server) in a public or private cloud environment, depending on context. For example, a user may perform day-to-day tasks by running a workload on a local machine (e.g., a desktop computer or laptop computer) when operating from home or work, and running a workload on a remote server or cloud instance when traveling, when the user switches to a device that does not have native applications installed, or when additional resources are needed to run the workload.

Many cloud service providers use a consumption-based pricing model to determine the cost of cloud computing applications, services and resources. A consumption-based pricing model helps to prevent wasteful spending by charging only for the applications, services and resources used. However, the cost of cloud-based services and resources is variable and generally depends on the service(s) provided, the cloud instance type, the number of times per hour a client device connects to the remote server/cloud instance, and the cloud service provider. For example, public cloud service providers, like Amazon Web Services (AWS), Microsoft Azure and Google Cloud Platform (GCP), provide various cloud instance types, such as General Purpose (e.g., balanced compute, memory and networking resources), Compute Optimized, Memory Optimized, etc. These cloud instance types utilize different cloud resources, and thus, have different rates associated therewith. For example, a cloud service provider may charge higher cloud instance rates when running a workload on a Compute Optimized or Memory Optimized cloud instance, and lower cloud instance rates when running a workload on a General Purpose cloud instance. Each cloud service provider provides their own tiered pricing model with different cloud instance rates for each cloud instance type.

Within an enterprise organization, information technology (IT) managers are often responsible for tracking and managing the usage of cloud services and resources on a per-user basis. To keep track of operating expenses, the IT manager may track the cost of cloud computing services and resources used on various cloud infrastructures (e.g., services and resources provided by multiple cloud service providers) and may optimize and/or manage the cost per user. Since a workload can be run on various cloud infrastructures, each having a variety of different cloud instance types and cloud instance rates, it becomes very difficult to manage the costs for each user in the enterprise environment.

Many cloud service providers provide cloud monitoring tools that may be used to monitor key performance metrics for their own cloud computing applications, services and resources. For example, Amazon AWS provides an AWS CloudWatch tool that tracks cloud resource usage data and provides alarm and auto-scaling features to automatically optimize cloud resource costs and reduce billing overages. For example, the AWS CloudWatch tool can be used to set an alarm on a key performance metric to trigger an auto-scaling feature, which automatically adds/removes cloud resources (i.e., scales cloud instance type up/down) based on the tracked cloud resource usage. However, the cloud monitoring tools provided by cloud service providers only track cloud resource usage and provide auto-scaling features for their own cloud computing applications, services and resources. They do not provide the ability to track cloud resource usage across multiple cloud service providers, map cloud resource usage to a particular user or client system in the enterprise environment, or push appropriate policies to the client systems to manage per-user cloud resource costs. As a consequence, cloud monitoring tools provided by cloud service providers cannot be used alone to effectively manage per-user cloud resource costs.

SUMMARY

The following description of various embodiments of systems and related methods is not to be construed in any way as limiting the subject matter of the appended claims.

Various embodiments of systems and methods are provided herein to trigger workload migration from cloud-based ("cloud-native") resources to local ("endpoint-native") resources, or vice versa, based on cloud resource usage data and telemetry data. For example, a system in accordance with the present disclosure may generally include a client agent running on a client system (e.g., a user's endpoint device) and a cloud-based orchestration service, which is communicatively coupled to the client system and one or more cloud service providers via a network. The client agent collects telemetry data from the client system pertaining to the user, the client system and/or a workload running on the client system. The orchestration service communicates with the one or more cloud service providers to obtain cloud resource usage data for the user. The orchestration service receives the telemetry data from the client agent and obtains the cloud resource usage data from the cloud service provider(s) during each cloud computing service billing cycle (e.g., during each as-a-Service (aaS) billing cycle).

Before the end of a current billing cycle, the orchestration service may use the cloud resource usage data obtained from the cloud service provider(s) and/or the telemetry data received from the client agent to determine the cloud resource usage expected for the user (i.e., the "expected cloud resource usage") at the end of the current billing cycle. In some embodiments, the orchestration service may generate a trigger to initiate migration of a workload from cloud-based resources to local resources, or vice versa, based on the expected cloud resource usage determined for the user. For example, the orchestration service may generate a trigger to initiate migration of a workload from cloud-based resources to local resources, if the expected cloud resource usage determined for the user exceeds a predetermined threshold value (e.g., a per-user budget allocation specified for cloud computing services). Alternatively, the orchestration service may generate a trigger to initiate migration of a workload from local resources to cloud-based resources based on one or more rules, which are used by the orchestration service to reduce utilization of the local resources when the expected cloud resource usage is less than the predetermined threshold value.

In some embodiments, the orchestration service may take various actions to initiate migration of the workload from cloud-based resources to local resources, or vice versa, if a trigger is generated. For example, the orchestration service may: (a) communicate with the client system and the cloud service provider(s) to migrate the workload from a cloud-based instance to an endpoint instance of the workload (or vice versa), (b) handle user session management during the workload migration, and (c) manage user authorization and authentication during the workload migration to maintain the user session across cloud/local environments. The orchestration service may take other actions, as described further herein.

Although described above in the context of a singular user/client system, the orchestration service described herein may monitor cloud resource usage data and telemetry data, determine an expected cloud resource usage, generate a trigger to initiate migration of a workload, and initiate migration of the workload (if a trigger is generated) for a plurality of users and client systems. In some embodiments, the plurality of users may be a plurality of enterprise users whose client systems (or endpoint devices) are managed by an information technology (IT) manager. Unlike the cloud monitoring tools provided by various cloud service providers, the orchestration service described herein enables IT managers to effectively manage cloud resource costs for each enterprise user across a variety of different cloud service providers.

According to one embodiment, a computer-implemented method is provided herein for triggering a migration of a workload. As described in more detail below, the computer-implemented method may be performed by execution of program instructions stored on an orchestration server, which is communicatively coupled via a network to a plurality of cloud service providers and a plurality of client systems. Each client system may include local resources for running workloads locally on the client system, and each cloud service provider may include cloud-based resources for running workloads on remote servers operated by that cloud service provider.

In some embodiments, the computer-implemented method may include receiving telemetry data from a client system associated with a user, and receiving cloud resource usage data from each of the plurality of cloud service providers. In some embodiments, the cloud resource usage data may include an amount of time the user utilized the cloud-based resources provided by the cloud service providers during a cloud computing service billing cycle. Before an end of the cloud computing service billing cycle, the computer-implemented method may further include: determining a per-day user workload run-rate for the user using the cloud resource data received from the plurality of cloud service providers; generating a user persona for the user using the telemetry data received from the client system; determining an expected cloud resource usage, which is expected for the user at the end of the cloud computing service billing cycle, based on the per-day user workload run-rate and/or the user persona; and generating a trigger to migrate the user's workload based on the expected cloud resource usage.

If a trigger is generated to migrate the user's workload from the cloud-based resources to the local resources, the computer-implemented method may further include initiating migration of the user's workload by supplying policies to the cloud service providers and the client system to automatically migrate the user's workload from a cloud instance of the workload to a local instance of the workload. On the other hand, if a trigger is generated to migrate the user's workload from the local resources to the cloud-based resources, the computer-implemented method may further include initiating migration of the user's workload by supplying policies to the client system and the cloud service providers to automatically migrate the user's workload from a local instance of the workload to a cloud instance of the workload.

Each cloud service provider may generally provide a plurality of different cloud instance types for running workloads on the remote servers operated by the cloud service provider. In some embodiments, the cloud resource usage data received from the plurality of cloud service providers may include a number of usage hours accumulated by the user and a corresponding cloud instance rate for each cloud instance type used by the user during the cloud computing service billing cycle.

In some embodiments, the computer-implemented method may determine a per-day user workload run-rate for the user by: determining a per-day utilization of each cloud instance type by dividing the number of usage hours accumulated by the user for each cloud instance type by a total number of days in the cloud computing service billing cycle; determining a per-day cost of each cloud instance type by multiplying the per-day utilization of each cloud instance type by the corresponding cloud instance rate; and determining the per-day user workload run-rate for the user by combining the per-day cost of each cloud instance type used during the cloud computing service billing cycle.

In some embodiments, the computer-implemented method may determine a cloud resource usage, which is expected for the user at the end of the cloud computing service billing cycle, by multiplying the per-day user workload run-rate for the user by a total number of days in the cloud computing service billing cycle. In some embodiments, the computer-implemented method may generate a trigger to migrate the user's workload from the cloud-based resources to the local resources if the expected cloud resource usage is greater than a threshold value. In other embodiments, the computer-implemented method may generate a trigger to migrate the user's workload from the cloud-based resources to the local resources if the expected cloud resource usage is greater than, less than or equal to a threshold value and the user persona is a lower tier user persona. In yet other embodiments, the computer-implemented method may generate a trigger to migrate the workload from the local resources to the cloud-based resources based on one or more rules, which are used by the computer-implemented method to reduce utilization of the local resources when the expected cloud resource usage is less than a threshold value. In some embodiments, the threshold may be per-user budget allocation specified for cloud computing services.

According to another embodiment, a system is provided herein to trigger migration of a workload. The system may generally include an orchestration server, which is communicatively coupled via a network to a plurality of client systems and a plurality of cloud service providers, and an orchestration service that is stored within a computer readable storage medium and executed by a processing device of the orchestration server. As noted above, each client system may include local resources for running workloads locally on the client system, and each cloud service provider may include cloud-based resources for running workloads on remote servers operated by the cloud service provider.

During a cloud computing service billing cycle, the orchestration service may be executed by the processing device to: obtain telemetry data from a client system associated with a user; obtain cloud resource usage data from each of the plurality of cloud service providers; and manage a cloud resource cost for the user based on the cloud resource usage data obtained from the plurality of cloud service providers and/or the telemetry data obtained from the client system. As noted above, the cloud resource usage data obtained from the plurality of cloud service providers may generally include an amount of time the user utilized the cloud-based resources provided by the cloud service providers during the cloud computing service billing cycle.

Before an end of the cloud computing service billing cycle, the orchestration service may be executed by the processing device to: determine a per-day user workload run-rate for the user using the cloud resource data obtained from the plurality of cloud service providers; generate a user persona for the user using the telemetry data obtained from the client system; and determine an expected cloud resource usage, which is expected for the user at the end of the cloud computing service billing cycle, based on the per-day user workload run-rate and/or the user persona. In some embodiments, the orchestration service may be further executed by the processing device to manage the cloud resource cost for the user by: generating a trigger to migrate the user's workload based on the expected cloud resource usage; and initiating migration of the user's workload from the cloud-based resources to the local resources, or vice versa, based on the trigger.

If a trigger is generated to migrate the user's workload from the cloud-based resources to the local resources, the orchestration service may be further executed by the processing device to initiate migration of the user's workload from a cloud instance of the workload to a local instance of the workload by: sending a request to at least one of the cloud service providers to hibernate the cloud instance of the workload; receiving context data pertaining to the hibernated cloud instance of the workload from the at least one cloud service provider; and sending a message containing the context data to the client system, wherein the message instructs the client system to start the local instance of the workload on the client system using the context data pertaining to the hibernated cloud instance.

If a trigger is generated to migrate the user's workload from the local resources to the cloud-based resources, the orchestration service may be further executed by the processing device to initiate migration of the user's workload from a local instance of the workload to a cloud instance of the workload by: sending a request to the client system to hibernate the local instance of the workload; receiving context data pertaining to the hibernated local instance of the workload from the client system; and sending a message containing the context data to at least one of the cloud service providers, wherein the message instructs the at least one cloud service provider to initiate the cloud instance of the workload on the remote servers operated by the at least one cloud service provider using the context data pertaining to the hibernated local instance.

Each cloud service provider may generally provide a plurality of different cloud instance types for running workloads on the remote servers operated by the cloud service provider. In some embodiments, the cloud resource usage data received from the plurality of cloud service providers may include a number of usage hours accumulated by the user and a corresponding cloud instance rate for each cloud instance type used by the user during the cloud computing service billing cycle.

In some embodiments, the orchestration service may be executed by the processing device to determine a per-day user workload run-rate for the user by: determining a per-day utilization of each cloud instance type by dividing the number of usage hours accumulated by the user for each cloud instance type by a total number of days in the cloud computing service billing cycle; determining a per-day cost of each cloud instance type by multiplying the per-day utilization of each cloud instance type by the corresponding cloud instance rate; and determining the per-day user workload run-rate for the user by combining the per-day cost of each cloud instance type used during the cloud computing service billing cycle.

In some embodiments, the orchestration service may be executed by the processing device to determine the expected cloud resource usage by multiplying the per-day user workload run-rate for the user by a total number of days in the cloud computing service billing cycle. In some embodiments, the orchestration service executed by the processing device may generate a trigger to migrate the user's workload from the cloud-based resources to the local resources if the expected cloud resource usage is greater than a threshold value. In other embodiments, the orchestration service executed by the processing device may generate a trigger to migrate the user's workload from the cloud-based resources to the local resources if the expected cloud resource usage is greater than, less than or equal to a threshold value and the user persona is a lower tier user persona. In yet other embodiments, the orchestration service executed by the processing device may generate a trigger to migrate the user's workload from the local resources to the cloud-based resources based on one or more rules, which are used by the orchestration service to reduce utilization of the local resources when the expected cloud resource usage is less than a threshold value.

BRIEF DESCRIPTION OF THE DRAWINGS

Other advantages of the present disclosure will become apparent upon reading the following detailed description and upon reference to the accompanying drawings in which.

Figure 1:
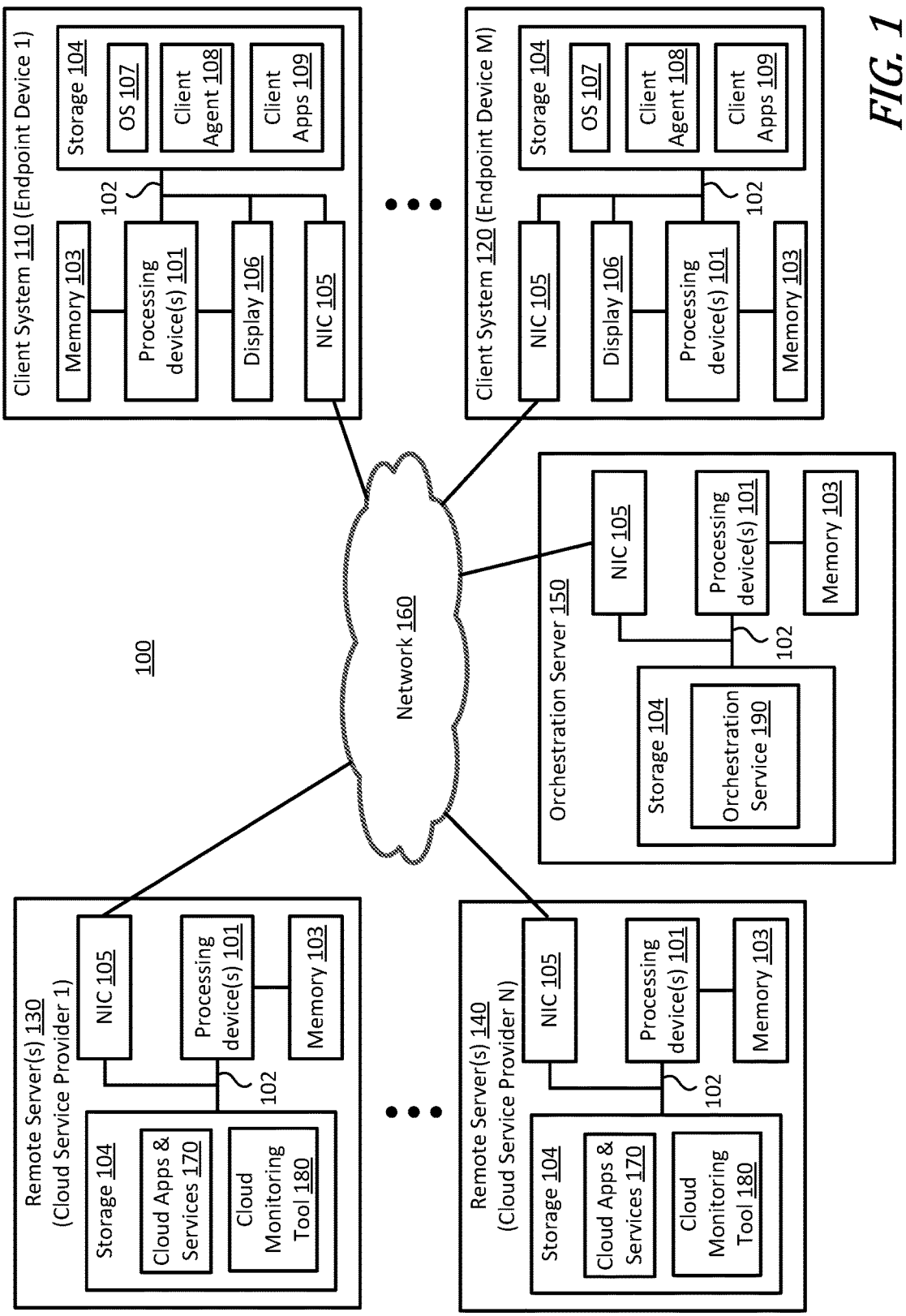
FIG. 1 is a block diagram illustrating an orchestration server communicatively coupled to a plurality of client systems and a plurality of cloud service providers via a network.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

FIG. 1 illustrates one exemplary embodiment of a network architecture 100 that includes multiple information handling systems 110, 120, 130, 140 and 150 that are in communication (e.g., via TCP/IP or Internet protocol) with each other across a network 160, such as the Internet. In the example embodiment shown in FIG. 1, information handling systems 110 and 120 represent a plurality of client systems (e.g., user endpoint devices 1-M), information handling systems 130 and 140 represent a plurality of remote servers operated by different cloud service providers (e.g., cloud service providers 1-N), and information handling system 150 represents an orchestration server, which communicates via the network 160 with the client systems 110/120 and the remote servers 130/140 operated by the various cloud service providers to perform the techniques described herein.

It is expressly noted that the network architecture 100 shown in FIG. 1 is exemplary only, and that the systems and methods disclosed herein may be implemented within any network architecture that enables the various information handling systems 110, 120, 130, 140 and 150 described herein to communicate via one or more networks and/or one or more network communication protocols. It is further noted that the information handling systems 110, 120, 130, 140 and 150 shown in FIG. 1 are also exemplary. Although certain components of the information handling systems 110, 120, 130, 140 and 150 are shown in FIG. 1 for illustrating embodiments of the present disclosure, the information handling systems disclosed herein are not restricted to including only those components shown in FIG. 1 and described below.

As shown in FIG. 1, each system 110, 120, 130, 140 and 150 may include at least one host processing device 101 (e.g., AMD or Intel-based CPU such as Itanium or any other type of suitable host processing device), one or more buses 102 (e.g., PCIe bus, USB, SMBus, SATA, other appropriate data buses such as memory bus, etc.), system memory 103 (e.g., DRAM) and at least one computer readable storage device 104 (e.g., one or more hard drives (HDDs), solid state drives (SSDs), etc.). In addition, each system 110, 120, 130, 140 and 150 may further include a network interface card (NIC) 105 that is communicatively coupled to network 160 to allow various components of the systems 110, 120, 130, 140 and 150 to communicate through NIC 105 with each other and other information handling systems across the network 160. For example, client systems 110/120 may utilize NIC 105 and network 160 to communicate with one or more of the remote servers 130/140 to access various cloud applications and services 170 provided by the cloud service providers. In addition, orchestration server 150 may utilize NIC 105 and network 160 to communicate with the client systems 110/120 and the remote servers 130/140, as discussed further herein.

Client systems 110 and 120 may include additional hardware and software components in addition to the hardware components mentioned above. For example, client systems 110 and 120 may include a display device 106 for displaying information to human users (e.g., LCD or LED device) and/or for receiving user input from human users (e.g., LCD or LED touchscreen device). The display device 106 may be coupled to bus(es) 102 and/or directly to host processing device 101, as shown, depending on the particular configuration of a given system (e.g., coupled directly to integrated graphics of a host processing device 101 and/or separately coupled via bus(es) 102 to provide user input signals to host processing device 101 through other components and/or to receive video information from a graphics processor unit "GPU"). Although not shown in FIG. 1, client systems 110 and 120 may include additional input/output (I/O) components (e.g., mouse, keyboard, touchpad, camera, peripheral devices, etc.) for receiving user input and other hardware/software components, as is known in the art.

In addition, each client system 110 and 120 may include a host operating system (OS) 107 (e.g., Microsoft Windows-based OS, Linux-based OS, Android OS, iOS, etc.), which is stored within the at least one computer readable storage 104 and executed by the at least one host processing device 101. In addition to OS 107, each client system 110 and 120 may further include a client agent 108 and one or more client applications 109, which are stored within the at least one computer readable storage 104 and executed by the at least one host processing device 101.

Client agent 108 may generally include computer program code or program instructions, which may be executed to perform various actions. In some embodiments, the client agent 108 may be an OS kernel, which is stored within the at least one computer readable storage 104 and executed by the at least one host processing device 101 during OS runtime to collect telemetry data from the client system 110/120 and perform other functions. As described in more detail below in reference to FIG. 2, the telemetry data collected by the client agent 108 may generally include, but is not limited to, user data (e.g., data pertaining to a user), workload data (e.g., data pertaining to at least one client application 109 or workload executed by the client system), performance data (e.g., data pertaining to system performance), location data (e.g., geographic information pertaining to the client system), network resource data (e.g., data pertaining to network resources accessible to the client system), etc.

Client applications 109 may include a wide variety of OS applications, which are stored within the at least one computer readable storage 104 and executed by the at least one host processing device 101 locally on the client system 110/120. For example, client applications 109 may include local instances of Microsoft Office applications (e.g., Microsoft Word, Excel, Power Point, etc.), meeting applications (e.g., Zoom, Microsoft Teams, Skype, etc.), collaboration applications (e.g., Miro, Slack, etc.), design applications (e.g., Adobe Photoshop, Autodesk, etc.) and others. It will be understood, however, that client applications 109 are not strictly limited to the example applications mentioned herein and may include substantially any other applications, which are stored and executed locally on the client system 110/120.

Figure 2:
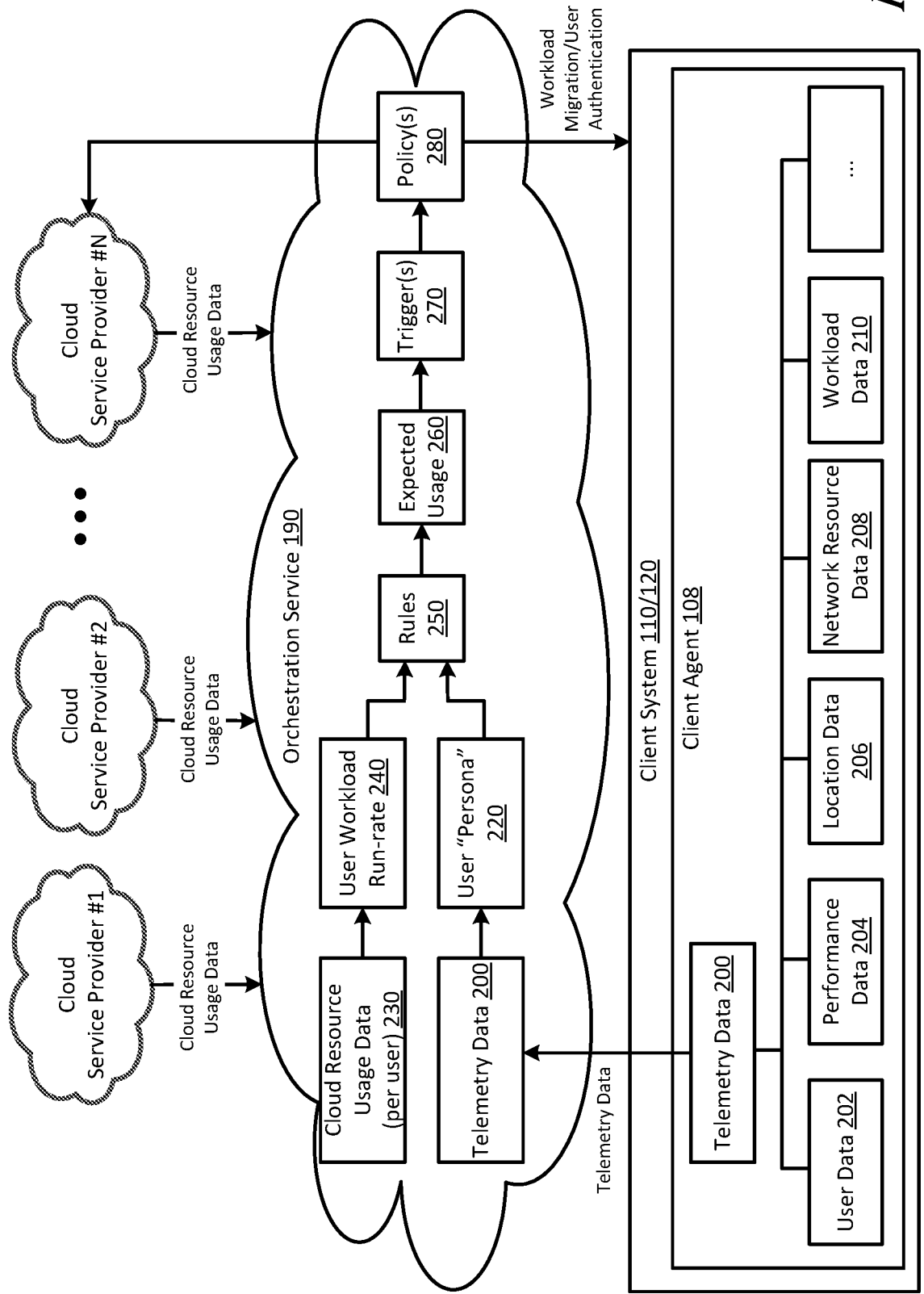
FIG. 2 is a block diagram illustrating communication between, and functionality performed by, the orchestration server, client systems and cloud service providers shown in FIG. 1.

In some embodiments, a cloud service provider may provide cloud instances of one or more of the client applications 109, which are stored and executed locally on the client system 110/120. For example, Microsoft Azure may provide cloud instances of Microsoft Office 365 applications and Google Cloud Platform may provide cloud instances of Google Workspace. In addition, each cloud service provider may provide cloud instances of enterprise applications for its users, including but not limited to, manageability services, security services, etc. Cloud instance(s) of the locally executed client application(s) 109 are illustrated in FIG. 2 as cloud applications and services 170. Unlike local instances of the client applications 109, the cloud instance(s) of the client application(s) 109 (i.e., the cloud applications and services 170) are stored/executed remotely on the remote server(s) 130/140 operated by the cloud service providers and accessed by the client systems 110/120 via the network 160.

Client systems 110 and 120 may comprise a wide variety of different types of information handling systems, such as personal computers (e.g., desktop computers, laptop computers, etc.), tablet computers, mobile devices (e.g., smart phones), and other types of information handling systems, which are capable of executing client applications 109 locally on the system (using "local resources") and accessing cloud applications and services 170 provided by various cloud service providers. As known in the art, utilization of cloud computing applications/services/resources (hereinafter referred to as "cloud-based resources") provides many advantages, such as scalability, data protection, business continuity and reduced IT costs. In addition, cloud computing provides collaboration efficiency and flexibility of work practices to employees and other users. However, cloud computing is not without cost.

As noted above, many cloud service providers use a consumption-based pricing model to determine the cost of the cloud-based resources offered by that provider. Although a consumption-based pricing model helps to prevent wasteful spending by charging only for the cloud-based resources used, the cost is variable and generally depends on: the cloud-based resources provided, the cloud instance type, the number of times per hour a client system or user connects to the cloud instance, and the cloud service provider. For example, public cloud service providers, like Microsoft Azure, Amazon Web Services (AWS) and Google Cloud Platform (GCP), provide a variety of cloud instance types (e.g., General Purpose, Compute Optimized, Memory Optimized, etc.), each having a different cloud instance rate, depending on the particular cloud applications, services and resources included within that type. For example, a cloud service provider may charge a higher cloud instance rate for running a workload on a Compute Optimized or Memory Optimized cloud instance, and a lower cloud instance rate for running a workload on a General Purpose cloud instance.

Each cloud service provider provides their own tiered pricing model with different cloud instance rates for each cloud instance type. Example cloud instance types provided by Microsoft Azure, Amazon Web Services (AWS) and Google Cloud Platform (GCP) are illustrated in Table 1 below.

TABLE 1

| Provider | Cloud Instance Type |
| --- | --- |
| AZURE | [D2a v4, D4a v4, D8a v4, D16a v4, D32a v4, D48a v4, D64a v4, D96a v4] |

TABLE 1-continued

| Provider | Cloud Instance Type |
|---|---|
| AWS | [t1.micro, t2.nano, t2.micro, t2.small, t2.medium, t2.large, t2.xlarge, t2.2xlarge] |
| GCP | [e2-standard-2, e2-standard-4, e2-standard-8, e2-standard-16, e2-standard-32] |

In a consumption-based pricing model, the utilization of cloud-based resources is typically charged by the hour. Table 2 illustrates an example per-hour billing rate (or cloud instance rate) for each cloud instance type shown in Table 1 above.

TABLE 2

| Provider | Cloud Instance Rate |
|---|---|
| AZURE | [0.096, 0.192, 0.384, 0.768, 1.536, 2.304, 3.072, 4.608] |
| AWS | [0.0255, 0.0058, 0.0116, 0.023, 0.0464, 0.1856, 0.3712, 0.1856] |
| GCP | [0.02, 0.04, 0.08, 0.16, 0.32] |

The information shown in Tables 1 and 2 can be obtained directly from the various cloud service providers. In some embodiments, orchestration server 150 may communicate with the cloud service providers shown in FIG. 1 to obtain the example cloud instance types and cloud instance rates shown in Tables 1 and 2, as described in more detail below.

Each cloud service provider 1-N may also provide their own cloud monitoring tool 180 to monitor key performance metrics for their own cloud computing applications, services and resources. For example, the AWS CloudWatch tool provided by AWS is an example of a cloud monitoring tool 180, which may be used to track cloud resource usage data and provide alarm and auto-scaling features to automatically optimize cloud resource costs and reduce billing overages. As noted above, the AWS CloudWatch tool can be used to set an alarm on a key performance metric to trigger an auto-scaling feature, which automatically adds/removes cloud resources (i.e., scales cloud instance type up/down) based on the tracked cloud resource usage. However, the cloud monitoring tools 180 typically provided by cloud service providers can only be used to track cloud resource usage data and provide auto-scaling features for their own cloud computing applications, services and resources. They do not provide the ability to track cloud resource usage across multiple cloud service providers, map cloud resource usage to a particular user or client system 110/120, or push appropriate policies to the client systems 110/120 to manage per-user cloud resource costs. As a consequence, the cloud monitoring tools 180 typically provided by cloud service providers cannot be used alone to effectively manage per-user cloud resource costs.

The systems and methods described herein improve upon conventional cloud monitoring tools 180 by: (a) obtaining telemetry data from a client system (or endpoint device) utilized by at least one user, (b) obtaining cloud resource usage data across multiple cloud service providers for the at least one user, and (c) optimizing and/or managing a cloud resource cost for the at least one user, during each cloud computing service billing cycle, based on the monitored data. In the embodiment shown in FIG. 1, the above-mentioned functionality is provided via the client agents 108 running on client systems 110 and 120 and an orchestration service 190 running on orchestration server 150.

Like client agents 108, the orchestration service 190 may generally include computer program code or program instructions, which may be executed to perform various actions. In some embodiments, the orchestration service 190 may be a service. In a service, the computer program code is divided into services, where each service runs a unique process and usually manages its own database. For example, services included within an orchestration service may generate alerts (e.g., triggers), log data, support user interfaces, communicate with application programming interfaces (APIs), handle user identification and authentication and perform various other tasks, as described in more detail below.

As shown in FIG. 1, the orchestration server 150 is communicatively coupled via the network 160 to the client systems 110/120 and the remote servers 130/140 operated by the cloud service providers 1-N. During each cloud computing service billing cycle (e.g., during each as-a-Service (aaS) billing cycle), the orchestration service 190 running on the orchestration server 150 communicates with the client systems 110/120 to obtain the telemetry data collected by the client agents 108. In addition, the orchestration service 190 communicates with the remote servers 130/140 to obtain cloud resource usage data from one or more of the cloud service providers 1-N. In some embodiments, the cloud resource usage data may include an amount of time that a user has accessed and/or utilized the cloud-based resources provided by each of the cloud service provider(s) during the cloud computing service billing cycle. The orchestration service 190 may be generally configured to obtain telemetry data and cloud resource usage data for at least one user. In some embodiments, the orchestration service 190 may obtain telemetry data and cloud resource usage data for each of a plurality of users (such as, but not limited to, employees within an enterprise organization).

Before the end of a current billing cycle, the orchestration service 190 may use the cloud resource usage data obtained from the cloud service provider(s) and/or the telemetry data received from the client agents 108 to determine a cloud resource usage, which is expected for a particular user (i.e., a "expected cloud resource usage") at the end of the current billing cycle. In some embodiments, the orchestration service 190 may generate a trigger to initiate a migration of a user's workload from cloud-based resources to local resources, or vice versa, based on the expected cloud resource usage determined for that user. For example, the orchestration service 190 may generate a trigger to migrate the user's workload from a cloud instance of the workload (e.g., a cloud application and/or service 170 running on a remote server 130/140) to a local instance of the workload (e.g., a corresponding client application 109 running on a client system 110/120), if the expected cloud resource usage determined for the user exceeds a predetermined threshold value (e.g., a per-user budget allocation specified for cloud computing services).

Alternatively, the orchestration service 190 may generate a trigger to migrate the user's workload from a local instance of the workload (e.g., a client application 109 running on a client system 110/120) to a cloud instance of the workload (e.g., a corresponding cloud application and/or service 170 running on a remote server 130/140) based on one or more rules, which are specified by an IT administrator and used by the orchestration service 190 to reduce utilization of local resources within the client system 110/120 when the expected cloud resource usage is less than the predetermined threshold value. For example, one or more rules may be specified to trigger a migration of the user's workload from a local instance to a cloud instance, so as to reduce platform compute, security, manageability, intelligence etc. resource utilization (e.g., to be running "cool and quiet" versus running hot with fans and local compute), if the expected cloud resource usage at the end of the current billing cycle is less than the per-user budget allocation specified for cloud computing services. In some embodiments, rules may also take into account the workload running on the client system 110/120. For example, a rule may be used to trigger a migration of the user's workload from a local instance to a cloud instance if: (a) the expected cloud resource usage at the end of the current billing cycle is less than the per-user budget allocation specified for cloud computing services, and (b) the user's workload can tolerate latency to/from the cloud and is not data I/O heavy.

In some embodiments, the orchestration service 190 may take appropriate action(s) to initiate migration of the workload from cloud-based resources to local resources, or vice versa, if a trigger is generated. For example, the orchestration service 190 may: (a) communicate with the client system(s) 110/120 and the cloud service provider(s) to migrate the user's workload from a cloud instance to a local instance of the workload (or vice versa), (b) handle user session management during the workload migration, and/or (c) manage user authorization and authentication during the workload migration to maintain the user session across cloud/local environments. The orchestration service 190 may also take other actions, as described further herein.

Although described above in the context of a singular user/client system, the orchestration service 190 described herein may generally be used to monitor cloud resource usage data and telemetry data, determine an expected cloud resource usage, generate a trigger to initiate migration of a user's workload, and initiate migration of the user's workload (if a trigger is generated) for a plurality of users and client systems 110/120. In some embodiments, the plurality of users may be a plurality of enterprise users (or employees) whose client systems 110/120 are managed by an IT manager. Unlike the cloud monitoring tools 180 typically provided by cloud service providers, the monitoring and management services provided by the orchestration service 190 and client agents 108 enable IT managers to effectively manage per-user cloud resource costs across a variety of different cloud service providers and infrastructures.

FIG. 2 is a block diagram illustrating the communication between, and the functionality performed by, the orchestration server 150, the client systems 110/120 and the cloud service providers 1-N shown in FIG. 1. For example, FIG. 2 provides various examples of telemetry data 200 that the client agent 108 may collect from the client system 110/120. As noted above, the telemetry data 200 may generally include user data 202, performance data 204, location data 206, network resource data 208, workload data 210, etc. Examples of user data 202 include calendar data, applications currently and previously used by the user, I/O devices used by the user, and other data pertaining to a user. Performance data 204 may include general processor (e.g., CPU, GPU, etc.) performance when running user applications, number of concurrently running applications, and other data pertaining to system performance. Location data 206 may include GPS data and other geographic information pertaining to the user and/or the user's client system (e.g., if the user is working in office premises or at home). Network resource data 208 may include network access data, such as if the user is using public Wi-Fi without authentication, home Wi-Fi or corporate Wi-fi to access network resources, and other data pertaining to network resources.

Workload data 210 may be collected by the client agent 108 when a client application 109 is initially installed within a client system 110/120, and again later when the client application 109 is subsequently launched. For example, when a client application 109 is initially installed within a client system 110/120, the client agent 108 may collect workload data 210 pertaining to the application being installed, such as container telemetry, new driver installations, registry entries, user settings, hardware resources accessed by the application (e.g., storage devices, memory, keyboard, mouse, camera, peripheral devices, etc.), geographic information, application version information, etc. When the client application 109 is subsequently launched, the client agent 108 may collect additional workload data 210 including, but not limited to, default user settings used when the application is launched, hardware resources being accessed by the application, read/write activity on the storage device, temporary storage location when the user uses the application and creates an artefact (e.g., a *.doc, *.pdf, etc.), 110 events, and type of workload (e.g., a local application, web application, etc.) In some embodiments, the workload data 210 may also include a network access universal resource locator (URL) and/or network activity, if the workload is a web application.

During each cloud computing service billing cycle (e.g., each aaS billing cycle), the orchestration service 190 communicates with client systems 110/120 to obtain the telemetry data 220 collected by client agent 108, and communicates with one or more cloud service providers to obtain cloud resource usage data 230 for each user. Examples of cloud resource usage data 230 obtained from each cloud service provider include, but are not limited, subscription plans (e.g., cloud applications and services to which the user is subscribed), cloud instance type, cloud instance rate, number of usage hours accumulated by the user for each cloud instance type, usage history, user authorization, etc.

Before the end of each cloud computing service billing cycle (e.g., x number of days before the end of the billing cycle), the orchestration service 190 may use the telemetry data 200 received from each client system 110/120 to generate a "persona" 220 for the user of that system. Examples of user "personas" include, but are not limited to, general users, developers (e.g., a user that works on SW/HW development), corporate executives, etc. In some embodiments, user personas may be grouped or categorized into hierarchical tiers, wherein higher tier user personas are afforded greater access (and/or less restrictions) to cloud-based resources than lower tier user personas. For example, a corporate executive (or another user) that frequently travels may be assigned to a higher tier persona, which gives the corporate executive/user prioritized access to cloud-based resources over general users and other users assigned to lower tier personas. In some embodiments, the orchestration service 190 may generate a user persona 220 for a user based on user behavior inferred from the telemetry data 200 and machine learning (artificial intelligence) training. In other embodiments, an IT administrator may define or assign a user persona 220 to a user based, at least in part, on the telemetry data 200 collected from the user's client system 110/120.

Before the end of each cloud computing service billing cycle, the orchestration service 190 may also use the cloud resource usage data 230 received from the cloud service provider(s) to calculate a user workload run-rate 240 for all cloud-based resources utilized by the user across all cloud service provider(s). To calculate the user workload run-rate 240, the orchestration service 190 may first determine the number of usage hours that a user has accumulated during the cloud computing service billing cycle. Every time the user accesses or utilizes a cloud instance during a given cloud computing service billing cycle, the orchestration service 190 updates the number of usage hours accumulated by the user for each cloud service provider and each cloud instance type provided thereby. Table 3 illustrates an example number of usage hours accumulated by an example user for each cloud service provider and cloud instance type x number of days (e.g., 5 days) before the end of the billing cycle.

TABLE 3

| Provider | Usage Hours per Cloud Instance |
|---|---|
| AZURE | [0, 0, 0, 0, 0, 0, 28, 10.5] |
| AWS | [10, 20, 0, 0, 0, 1, 0, 6.2] |
| GCP | [0, 0, 0, 0, 0, 0, 0, 0] |

As shown in Table 2 and Table 3 above, the example user accumulated:
  28 hours of D64a v4 and 10.5 hours of D96a v4 cloud instances provided by Microsoft Azure, and
  10 hours of t.micro, 20 hours of t2.nano, 1 hour of t2.large, and 6.2 hours of t2.2xlarge cloud instances provided by AWS
x number of days (e.g., 5 days) before the end of the example billing cycle. The example user did not utilize any cloud services provided by GCP during the example billing cycle.

Once the usage hours are obtained for each cloud instance (Table 3), the orchestration service 190 determines the per-day utilization of each cloud instance by dividing the usage hours per cloud instance (Table 3) by the number of billing cycle days. Table 4 illustrates an example per-day utilization of each cloud instance for a 30-day billing cycle.

TABLE 4

| Provider | Per-day Utilization (usage hours/day) of each Cloud Instance |
|---|---|
| AZURE | [0, 0, 0, 0, 0, 0, 28/30, 10.5/30] |
| AWS | [10/30, 20/30, 0, 0, 0, 1/30, 0, 6.2/30] |
| GCP | [0, 0, 0, 0, 0, 0, 0, 0] |

Once the per-day utilization of each cloud instance (Table 4) is determined, the orchestration service 190 determines the per-day cost of such utilization by multiplying the usage hours/day for each cloud instance (Table 4) by the corresponding cloud instance rate (Table 2). Table 5 illustrates an example per-day cost for the cloud usage hours accumulated for the example user (Table 3) 5 days before the end of the billing cycle (e.g., on the $25^{th}$ day of a 30-day billing cycle).

TABLE 5

| Provider | Per-day Cost ($) of each Cloud Instance |
|---|---|
| AZURE | [0, 0, 0, 0, 0, 0, $2.86, $1.612] |
| AWS | [$0.0245, $0.987, 0, 0, 0, $0.124, 0, $0.038] |
| GCP | [0, 0, 0, 0, 0, 0, 0, 0] |

The orchestration service 190 determines the user workload run-rate 240 by combining the per-day cost (Table 5) for all cloud-based resources utilized by the example user across all cloud service provider(s). In the example shown in Table 5 above, the user workload run-rate 240 for all cloud-based resources is: $2.86+$1.612+$0.0245+$0.987+$0.124+ $0.038=$5.64/day. This means, that on the $25^{th}$ day, the example user has already utilized $5.64×25=$141 of cloud computing services.

Before the end of each cloud computing service billing cycle (e.g., on the $25^{th}$ day of the 30-day billing cycle), the orchestration service 190 may use the user workload run-rate 240 and/or the user persona 220 to determine the cloud resource usage that is expected for the user (i.e., the expected cloud resource usage 260) at the end of the current billing cycle (e.g., on the $30^{th}$ day of the 30-day billing cycle). For example, the orchestration service 190 may utilize the user workload run-rate 240 to determine that the example user is expected to use $5.64×30=$169 of cloud computing services on the last day of the billing cycle. If the expected cloud resource usage 260 at the end of the current billing cycle is greater than a per-user budget allocation specified for cloud computing services (e.g., $150), the orchestration service 190 may generate a trigger 270 to migrate the user's workload from cloud-based resources to local resources, and thereby prevent the user from accessing cloud-based resources during the remainder of the billing cycle.

In some embodiments, the orchestration service 190 may use a set of rules 250 to determine the expected cloud resource usage 260 at the end of the current billing cycle and/or the need to limit a user's access to cloud-based resources during a remainder of the billing cycle. In the embodiment shown in FIG. 2, for example, the user workload run-rate 240 and the user persona 220 are supplied to a set of rules 250, which take into account the user's current cloud resource usage and the user's persona 220 to determine the user's expected cloud resource usage 260 at the end of the current billing cycle and any limitations placed thereon. A wide variety of rules 250 may be established, for example, by an IT administrator. In one example, a rule 250 may place no restrictions on the user's cloud resource usage, regardless of the user's expected cloud resource usage 260 at the end of the current billing cycle, if the user has a higher tier user persona 220 (e.g., if the user is a corporate executive that frequently travels on business). In another example, another rule 250 may place restrictions on the user's access to cloud-based resources if the user's expected cloud resource usage 260 at the end of the current billing cycle is less than a per-user budget allocation specified for cloud computing services (e.g., $150) and the user has a lower tier user persona 220 (e.g., if the user is a developer who typically works on a corporate machine with native applications).

In one embodiment, the orchestration service 190 may generate a trigger 270 to initiate migration of a user's workload from cloud-based resources to local resources (or vice versa) based on the expected cloud resource usage 260 at the end of the current billing cycle. For example, the orchestration service 190 may generate a trigger 270 to initiate migration of the user's workload from a cloud instance of the workload (e.g., a cloud application and/or service 170 provided by a cloud service provider) to a local instance of the workload (e.g., a corresponding client application 109 running on a client system 110/120), if the expected cloud resource usage 260 (e.g., $5.64×30=$169) at the end of the current billing cycle is greater than a per-user budget allocation specified for cloud computing services (e.g., $150) or another predetermined threshold value. Alternatively, the orchestration service 190 may generate a trigger 270 to migrate a user's workload from a local instance of the workload (e.g., a client application 109 running on a client system 110/120) to a cloud instance of the workload (e.g., a corresponding cloud application and/or service 170 provided by a cloud service provider), based on one or more rules, which are specified by an IT administrator and used by the orchestration service 190 to reduce utilization of local resources within the client system 110/120 when the expected cloud resource usage 260 at the end of the current billing cycle is less than the per-user budget allocation specified for cloud computing services.

In another embodiment, the orchestration service 190 may generate a trigger 270 to initiate migration of a workload from a cloud instance having higher cloud instance rate to cloud instance having a lower cloud instance rate (or vice versa) based on the expected cloud resource usage 260 at the end of the current billing cycle. For example, the orchestration service 190 may generate a trigger 270 to initiate migration of a user's workload from a D96a v4 instance ($4.608/hour) to a D2a v4 instance ($0.096/hour) (see, Tables 1 and 2 above), if the expected cloud resource usage 260 (e.g., $5.64×30=$169) at the end of the current billing cycle is greater than a per-user budget allocation specified for cloud computing services (e.g., $150) or another predetermined threshold value. Alternatively, the orchestration service 190 may generate a trigger 270 to migrate the user's workload from a cloud instance having a lower cloud instance rate to a cloud instance having a higher cloud instance rate, if a higher tier user persona 220 has been defined or generated for the user (e.g., if the user is a corporate executive currently travelling on business).

If a trigger 270 is generated, the orchestration service 190 may take one or more action(s) to initiate migration of the user's workload from cloud-based resources to local resources, or vice versa. For example, the orchestration service 190 may communicate various policies 280 to the client system 110/120 and the cloud service provider(s) to migrate the user's workload from a cloud instance of the workload to a local instance of the workload (or vice versa). In addition to migrating the user workload (or user session) from one instance to another, additional policies 280 may be used during the workload migration to handle user session management and/or manage user authorization and authentication to maintain the user session across cloud/local environments.

For example, when migrating a workload from a cloud instance to a local instance of the workload, the policies 280 supplied to the client system 110/120 may be used to handle user session management by communicating cloud-native workload settings, cloud-native virtualized handles, etc., to the client system 110/120. In some cases, the policies 280 supplied to the client system 110/120 may perform other actions such as, for example, changing settings on the client application in anticipation of the workload migration, installing other client applications, etc. In some embodiments, the orchestration service 190 may use additional policies 280 to manage user authorization and authentication during the workload migration and maintain user session across cloud/local environments. For example, the orchestration service 190 may use additional policies 280 to manage user login credentials across cloud/local environments.

Figure 3:
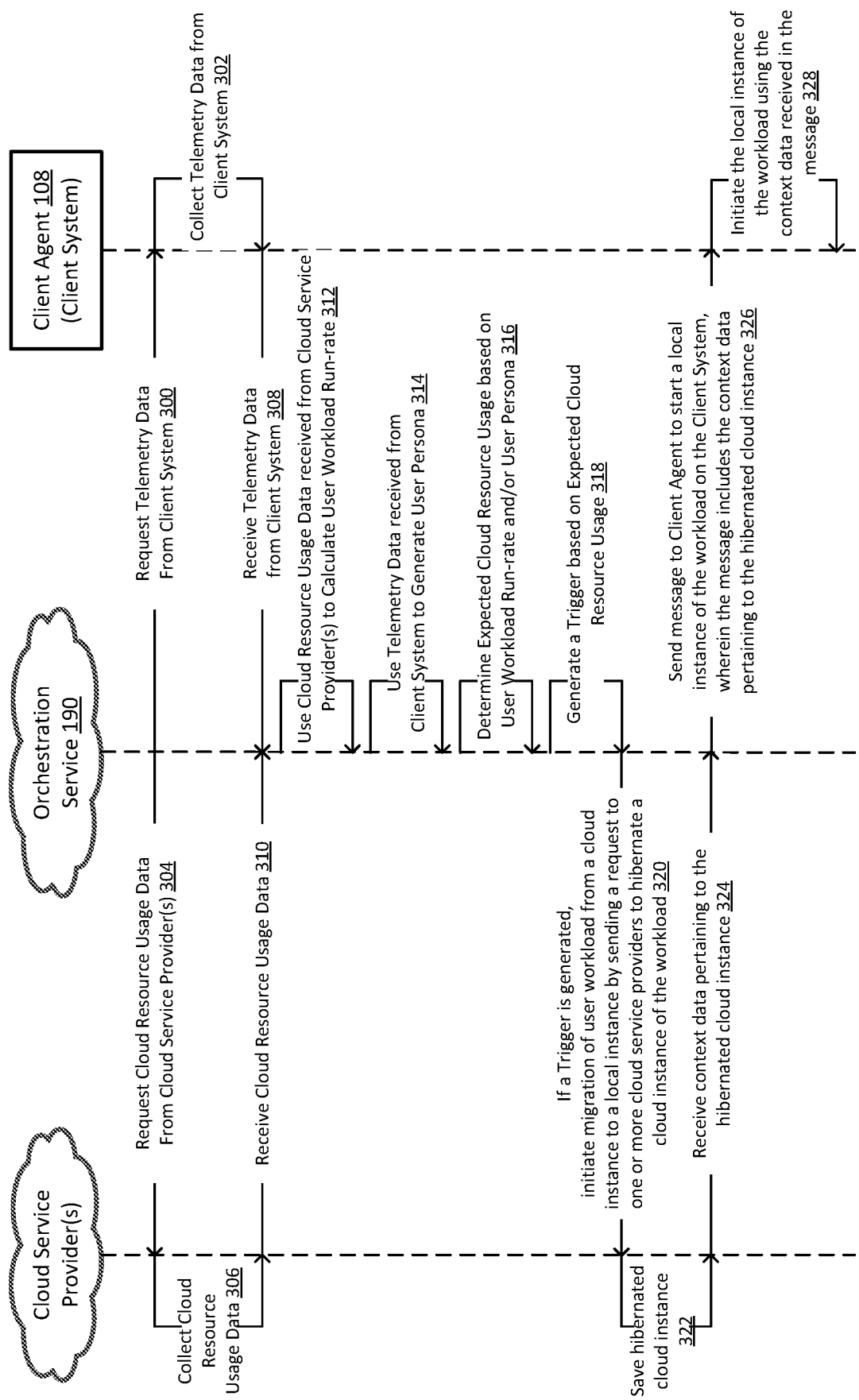
FIG. 3 illustrates an example process flow for triggering migration of a workload from a cloud instance to a local instance of the workload.

FIG. 3 illustrates an example process flow for triggering migration of a workload from a cloud instance to a local instance of the workload. As noted above, the orchestration service 190 communicates with the client systems 110/120 and the one or more cloud services providers to obtain telemetry data and cloud resource usage data. In the embodiment shown in FIG. 3, the orchestration service 190 may send a request to a client system (in step 300) to obtain the telemetry data collected by the client agent (in step 302) running on that system. As noted above, the telemetry data collected by the client agent (in step 302) may pertain to the client system, a user of the client system and/or a workload running on the client system.

In addition, the orchestration service 190 may send request(s) to one or more cloud service providers (in step 304) to obtain the cloud resource usage data, which was collected by the cloud service provider(s) for the user (in step 306). As noted above, the cloud resource data collected by each cloud service provider (in step 306) may include, but is not limited to, subscription plans (e.g., cloud applications and services to which the user is subscribed), cloud instance type, cloud instance rate, number of usage hours accumulated by the user for each cloud instance type, usage history, user authorization, etc.

In general, the orchestration service 190 may request the telemetry data (in step 300) and the cloud resource usage data (in step 304) at any time during a cloud computing service billing cycle. In some embodiments, the orchestration service 190 may request the telemetry data (in step 300) and the cloud resource usage data (in step 304) before the end of each cloud computing service billing cycle. Although shown in FIG. 3 as occurring simultaneously, the orchestration service 190 may request the telemetry data (in step 300) and the cloud resource usage data (in step 304) at one or more different times throughout the billing cycle.

Before the end of each cloud computing service billing cycle (e.g., x number of days before the end of a billing cycle), the orchestration service 190 may use the cloud resource usage data received from the cloud service provider(s) (in step 310) to calculate a user workload run-rate (in step 312) for all cloud-based resources utilized by the user across all cloud service providers. In some embodiments, the orchestration service 190 may use the endpoint telemetry received from the client system (in step 308) to generate a user persona for the user (in step 314). In other embodiments, a user persona may be defined for the user by an IT administrator, as set forth above. Next, the orchestration service 190 may use the user workload run-rate and/or the user persona to determine the cloud resource usage that is expected for the user (i.e., the expected cloud resource usage) at the end of the current billing cycle (in step 316). In some cases, the orchestration service 190 may generate a trigger to initiate migration of a workload from a cloud instance to a local instance of the workload based on the expected cloud resource usage (in step 318). In one example, the orchestration service 190 may generate a trigger (in step 318) if the expected cloud resource usage exceeds a per-user budget allocation specified for cloud computing services or another predetermined threshold value.

If a trigger is generated (in step 318), the orchestration service 190 may initiate migration of a workload from a cloud instance to a local instance of the workload by sending a request to the cloud service provider(s) to hibernate or shutdown the cloud instance of the workload (in step 320). After the hibernated cloud instance is saved in the back-end cloud service (e.g., Microsoft Azure, AWS, GCP, etc.) (in step 322), the orchestration service 190 receives context data pertaining to the hibernated cloud instance of the workload (in step 324). The context data received in step 324 may include data about the hibernated cloud instance of the workload such as, but not limited to, the cloud application or service 170 in use, the version of the cloud application or service 170, and the file, document, sheet, etc., that the user was working on. If more than one cloud application or service 170 is in use, the orchestration service 190 may receive context data pertaining to each cloud application and/or service 170 (in step 324).

After receiving the context data in step 324, the orchestration service 190 may send a message to the client agent 108 to start a local instance of the workload on the client system (in step 326). In some embodiments, the orchestration service 190 may utilize existing manageability mechanisms (such as, e.g., the Microsoft System Center Configuration Manager, SCCM) to send a message or command to the client agent 108 instructing the client agent 108 to start a new instance of the workload that is native to the client system. The message sent in step 326 may include the context data received in step 324, so that the client agent 108 can initiate a local instance of the workload on the client system (in step 328) using the context data pertaining to the hibernated cloud instance. Upon receiving the message (e.g., the SCCM command), the client agent initiates a local instance of the workload (e.g., a locally executed client application 109) in step 328 and uses the context data received in step 324 to open the file, document, sheet, etc. that was previously used in the cloud instance of the workload.

Figure 4:
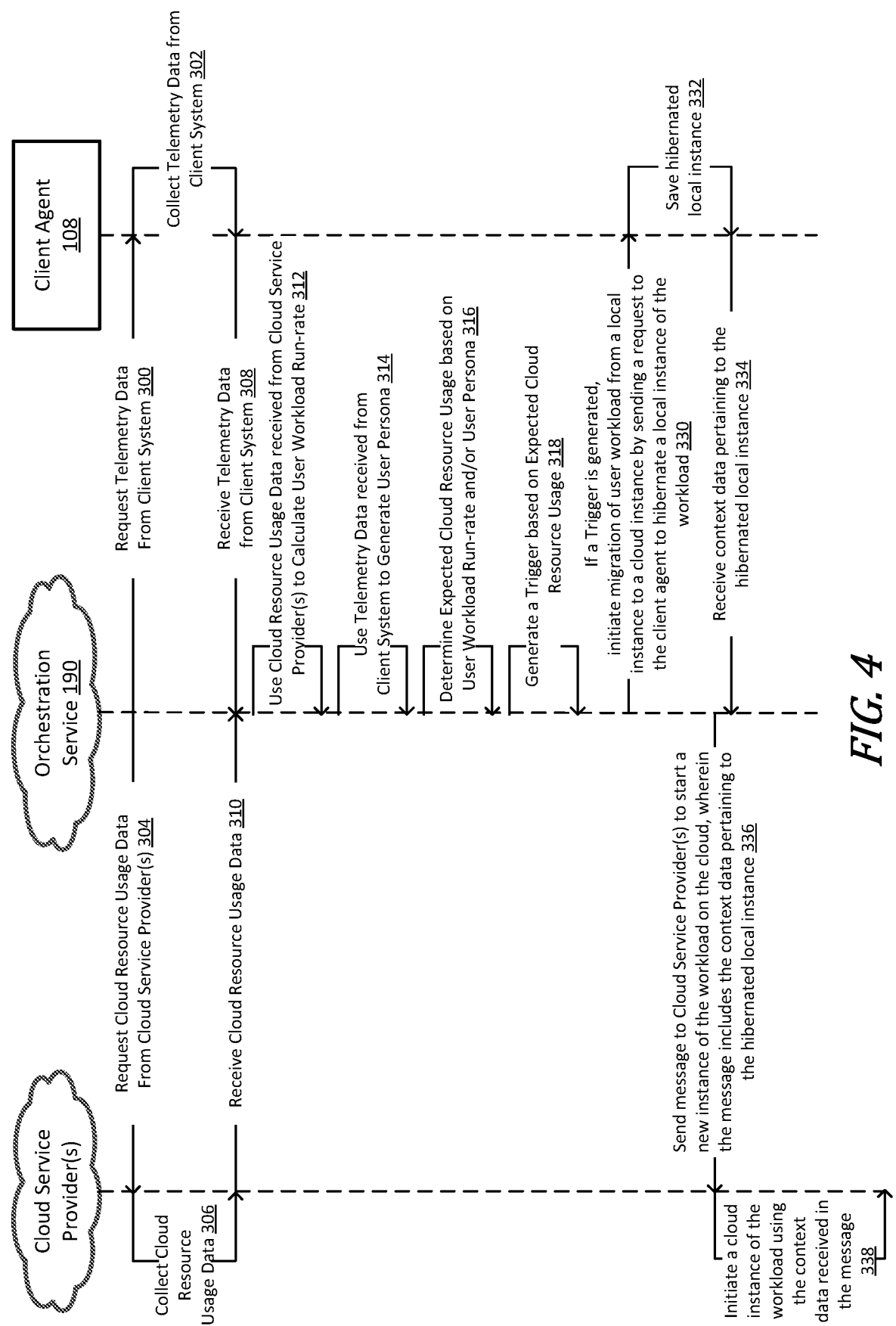
FIG. 4 illustrates an example process flow for triggering migration of a workload from a local instance to a cloud instance of the workload.

FIG. 4 illustrates an example process flow for triggering migration of a workload from a local instance to a cloud instance of the workload. Many of the steps shown in FIG. 3 are repeated in the process flow shown in FIG. 4. For example, steps 300-316 may generally be performed as described above in reference to FIG. 3. In the process flow shown in FIG. 4, however, the orchestration service 190 may generates a trigger to initiate migration of a workload from a local instance to a cloud instance of the workload based on the expected cloud resource usage (in step 318). For example, the orchestration service 190 may generate a trigger (in step 318) based on the expected cloud resource usage and one or more rules, which are used by the orchestration service 190 to reduce utilization of local resources within the client system.

If a trigger is generated (in step 318), the orchestration service 190 may initiate migration of a workload from a local instance to a cloud instance of the workload by sending a request to the client agent 108 to hibernate or shutdown the local instance of the workload (in step 330). After the hibernated local instance is saved in the client system (in step 332), the orchestration service 190 receives context data pertaining to the hibernated local instance of the workload (in step 334). The context data received in step 334 may include data about the local instance of the workload such as, but not limited to, the client application(s) 109 in use, the version(s) of the client application(s) 109 in use, and the file, document, sheet, etc., that the user was working on. If more than one client application 109 is in use, the orchestration service 190 may receive context data pertaining to each client application 109 (in step 334).

After receiving the context data in step 334, the orchestration service 190 may send a message to one or more cloud service providers to start a cloud instance of the workload on the cloud (in step 336). In some embodiments, the orchestration service 190 may utilize an API call to send a message or command to the cloud service provider(s) to open a cloud-native version of the workload. The message sent in step 336 may include the context data received in step 334, so that the cloud service provider(s) can initiate a cloud instance of the workload (in step 338) using the context data pertaining to the hibernated local instance. Upon receiving the message, the cloud service provider(s) may initiate a cloud instance of the workload as a remotely executed cloud application and/or service 170 in step 338 and use the context data received in step 334 to open the file, document, sheet, etc. that was previously used in the local instance of the workload.

Figure 5:
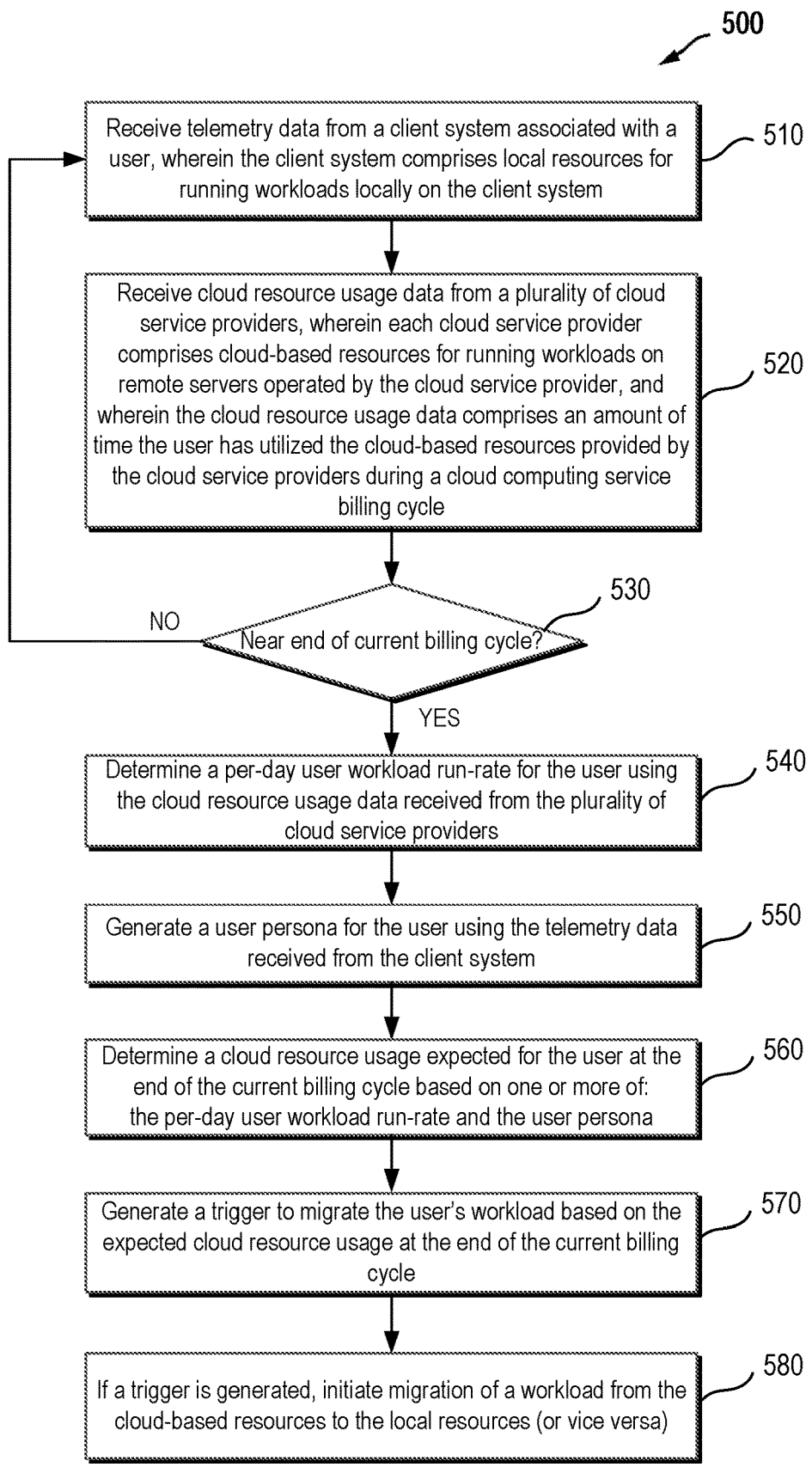
FIG. 5 is a flowchart diagram illustrating one embodiment of a computer-implemented method to trigger a migration of a workload.

FIG. 5 illustrates one embodiment of a method 500 that may be used to trigger migration of a workload. The method 500 shown in FIG. 5 is a computer-implemented method, which may be performed by execution of program instructions (e.g., program instructions contained within the orchestration service 190) on an orchestration server 150 communicatively coupled via a network 160 to a plurality of cloud service providers and a plurality of client systems 110/120. As noted above, each client system 110/120 may include local resources for running workloads locally on the client system, and each cloud service provider may include cloud-based resources for running workloads on the remote server(s) 130/140 operated by that cloud service provider.

In some embodiments, the computer-implemented method 500 shown in FIG. 5 may receive telemetry data from a client system associated with a user (in step 510) and cloud resource usage data from each of the plurality of cloud service providers (in step 520). The cloud resource usage data received in step 520 may include, for example, an amount of time the user utilized the cloud-based resources provided by the cloud service providers during a cloud computing service billing cycle. The telemetry data and the cloud resource usage data may be received at any time during the cloud computing service billing cycle. In some embodiments, the telemetry data and the cloud resource usage data may be periodically or continually received (or obtained) from the client system and the cloud service providers during the cloud computing service billing cycle before the billing cycle ends. In other embodiments, the telemetry data and the cloud resource usage data may be received once near the end of the cloud computing service billing cycle. For example, the telemetry data and the cloud resource usage data may be received 15 days, 10 days, 5 days, etc., before the end of the cloud computing service billing cycle.

When the computer-implemented method 500 determines that the cloud computing service billing cycle is near the end of the current billing cycle (YES branch of step 530), the computer-implemented method 500 performs additional steps to determine if a trigger should be generated to migrate a user's workload from cloud-based resources to local resources, or vice versa. For example, the computer-implemented method 500 may use the cloud resource usage data received in step 520 and/or the telemetry data received in step 510 to determine a cloud resource usage, which is expected for the user at the end of the cloud computing service billing cycle. In the example embodiment shown in FIG. 5, the computer-implemented method 500 determines an expected resource usage for the user at the end of the cloud computing service billing cycle by: determining a per-day user workload run-rate for the user using the cloud resource data received from the plurality of cloud service providers to (in step 540); generating a user persona for the user using the telemetry data received from the client system (in step 550); and determining the expected cloud resource usage based on the per-day user workload run-rate and/or the user persona (in step 560).

In some embodiments, the computer-implemented method 500 may generate a trigger (in step 570) to migrate the user's workload from cloud-based resources to local resources, or vice versa, based on the expected cloud resource usage determined in step 560. In one example, the computer-implemented method 500 may generate a trigger to migrate the user's workload from the cloud-based resources to the local resources (in step 570) if the expected cloud resource usage is greater than a threshold value. In another example, the computer-implemented method 500 may generate a trigger to migrate the user's workload from the cloud-based resources to the local resources (in step 570) if the expected cloud resource usage determined in step 560 is greater than, less than or equal to the threshold value, but the user persona generated in step 550 is a lower tier user persona. In yet another example, the computer-implemented method 500 may generate a trigger to migrate the workload from the local resources to the cloud-based resources (in step 570) based on one or more rules, which are used by the computer-implemented method 500 to reduce utilization of local resources within the client system when the expected cloud resource usage is less than the threshold value.

If a trigger is generated (in step 570), the computer-implemented method 500 may initiate migration of the user's workload from cloud-based resources to local resources, or vice versa, in step 580. For example, if a trigger is generated to migrate the user's workload from cloud-based resources to local resources, the computer-implemented method 500 may initiate migration of the user's workload by supplying policies to the cloud service provider(s) and the client system to automatically migrate the user's workload from a cloud instance of the workload to a local instance of the workload. On the other hand, if a trigger is generated to migrate the user's workload from local resources to cloud-based resources, the computer-implemented method 500 may initiate migration of the user's workload by supplying policies to the client system and the cloud service provider(s) to automatically migrate the user's workload from a local instance of the workload to a cloud instance of the workload.

It will be understood that one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus, the invention is not limited to only those combinations shown herein, but rather may include other combinations.

What is claimed is:

1. A computer-implemented method for triggering a migration of a workload, wherein the computer-implemented method is performed by execution of program instructions stored on an orchestration server communicatively coupled via a network to a plurality of cloud service providers and a plurality of user endpoint client devices that are each utilized by a respective user, and wherein the computer-implemented method comprises:

receiving telemetry data from a first one of the user endpoint client devices utilized by a respective first user, wherein the first user endpoint client device comprises local resources for running workloads locally for the first user on the first user endpoint client device;

receiving cloud resource usage data from each of the plurality of cloud service providers, wherein each cloud service provider comprises cloud-based resources for running workloads on remote servers operated by that cloud service provider, and wherein the cloud resource usage data comprises an amount of time the first user utilized the cloud-based resources provided by the cloud service providers during a cloud computing service billing cycle;

wherein before an end of the cloud computing service billing cycle, the computer-implemented method further comprises:

determining a per-day user workload run-rate for the first user using the cloud resource data received from the plurality of cloud service providers;

generating a user persona for the first user using the telemetry data received from the first user endpoint client device;

determining an expected cloud resource usage, which is expected for the first user at the end of the cloud computing service billing cycle, based on the per-day first user workload run-rate and/or the first user persona; and generating a trigger to migrate the first user's workload based on the expected cloud resource usage;

wherein the telemetry data comprises the telemetry data collected by a client agent executing on the first endpoint client device; and wherein if a trigger is generated to migrate the user's workload from the cloud-based resources to the local resources of the first user endpoint client device, the computer-implemented method further comprises:

initiating migration of the first user's workload by supplying policies to the cloud service providers and the first user endpoint client device to automatically migrate the first user's workload from a cloud instance of the workload to a local instance of the workload running on the first user endpoint client device, and wherein if a trigger is generated to migrate the user's workload from the local resources of the first user endpoint client device to the cloud-based resources, the computer-implemented method further comprises:

initiating migration of the first user's workload by supplying policies to the first user endpoint client device and the cloud service providers to automatically migrate the user's workload from a local instance of the workload running on the first user endpoint client device to a cloud instance of the workload.

2. The computer-implemented method of claim 1, wherein if a trigger is generated to migrate the first user's workload from the cloud-based resources to the local resources of the first user endpoint client device, the computer-implemented method further comprises initiating migration of the user's workload by supplying policies to the cloud service providers and the first user endpoint client device to automatically migrate the user's workload from a cloud instance of the workload to a local instance of the workload running on the first user endpoint client device.

3. The computer-implemented method of claim 1, wherein if a trigger is generated to migrate the user's workload from the local resources of the first user endpoint client device to the cloud-based resources, the computer-implemented method further comprises initiating migration of the first user's workload by supplying policies to the first user endpoint client device and the cloud service providers to automatically migrate the user's workload from a local instance of the workload running on the first user endpoint client device to a cloud instance of the workload.

4. The computer-implemented method of claim 1, wherein each cloud service provider provides a plurality of different cloud instance types for running workloads on the remote servers operated by the cloud service provider, and wherein the cloud resource usage data received from the plurality of cloud service providers comprises a number of usage hours accumulated by the user and a corresponding cloud instance rate for each cloud instance type used by the user during the cloud computing service billing cycle.

5. The computer-implemented method of claim 4, wherein said determining a per-day user workload run-rate for the user comprises:

determining a per-day utilization of each cloud instance type by dividing the number of usage hours accumulated by the user for each cloud instance type by a total number of days in the cloud computing service billing cycle;

determining a per-day cost of each cloud instance type by multiplying the per-day utilization of each cloud instance type by the corresponding cloud instance rate; and determining the per-day user workload run-rate for the user by combining the per-day cost of each cloud instance type used during the cloud computing service billing cycle.

6. The computer-implemented method of claim 1, wherein said determining a cloud resource usage, which is expected for the user at the end of the cloud computing service billing cycle, comprises multiplying the per-day user workload run-rate for the user by a total number of days in the cloud computing service billing cycle.

7. The computer-implemented method of claim 6, wherein said generating a trigger comprises generating a trigger to migrate the user's workload from the cloud-based resources to the local resources of the first user endpoint client device if the expected cloud resource usage is greater than a threshold value.

8. The computer-implemented method of claim 6, wherein said generating a trigger comprises generating a trigger to migrate the user's workload from the cloud-based resources to the local resources of the first user endpoint client device if the expected cloud resource usage is greater than, less than or equal to a threshold value and the user persona is a lower tier user persona.

9. The computer-implemented method of claim 6, wherein said generating a trigger comprises generating a trigger to migrate the workload from the local resources of the first user endpoint client device to the cloud-based resources based on one or more rules, which are used by the computer-implemented method to reduce utilization of the local resources of the first user endpoint client device when the expected cloud resource usage is less than a threshold value.

10. A system, comprising:

an orchestration server communicatively coupled via a network to a plurality of user endpoint client devices and a plurality of cloud service providers, wherein each respective endpoint client device is utilized by a respective user and comprises local resources for running workloads locally on the respective endpoint client device, and wherein each cloud service provider comprises cloud-based resources for running workloads on remote servers operated by the cloud service provider; and an orchestration service stored within a computer readable storage medium and executed by a processing device of the orchestration server, wherein during a cloud computing service billing cycle the orchestration service is executed by the processing device to:

obtain telemetry data from a client agent executing on a first one of the user endpoint client devices utilized by a respective first user;

obtain cloud resource usage data from each of the plurality of cloud service providers, wherein the cloud resource usage data comprises an amount of time the first user utilized the cloud-based resources provided by the cloud service providers during the cloud computing service billing cycle; and manage a cloud resource cost for the first user based on the cloud resource usage data obtained from the plurality of cloud service providers and/or the telemetry data obtained from the first user endpoint client device;

wherein the orchestration service is executed by the processing device to manage the cloud resource cost for the first user by:

generating a trigger to migrate the first user's workload based on the cloud resource data for the first user obtained from the plurality of cloud service providers and/or the telemetry data from the first user endpoint client device; and initiating migration of the first user's workload from the cloud-based resources to the local resources of the first user endpoint client device, or vice versa, based on the trigger.

11. The system of claim 10, wherein before an end of the cloud computing service billing cycle, the orchestration service is executed by the processing device to:
- determine a per-day user workload run-rate for the first user using the cloud resource data obtained from the plurality of cloud service providers;
- generate a first user persona for the first user using the telemetry data obtained from the first user endpoint client device; and
- determine an expected cloud resource usage, which is expected for the first user at the end of the cloud computing service billing cycle, based on the per-day first user workload run-rate and/or the first user persona.

12. The system of claim 11, wherein the orchestration service is executed by the processing device to manage the cloud resource cost for the first user by:
- generating the trigger to migrate the first user's workload based on the expected cloud resource usage; and
- initiating migration of the first user's workload from the cloud-based resources to the local resources of the first user endpoint client device, or vice versa, based on the trigger.

13. The system of claim 12, wherein if the trigger is generated to migrate the first user's workload from the cloud-based resources to the local resources, the orchestration service is further executed by the processing device to initiate migration of the first user's workload from a cloud instance of the workload to a local instance of the workload running on the first user endpoint client device by:
- sending a request to at least one of the cloud service providers to hibernate the cloud instance of the workload;
- receiving context data pertaining to the hibernated cloud instance of the workload from the at least one cloud service provider; and
- sending a message containing the context data to the first user endpoint client device, wherein the message instructs the first user endpoint client device to start the local instance of the workload on the first user endpoint client device using the context data pertaining to the hibernated cloud instance.

14. The system of claim 13, wherein if a trigger is generated to migrate the first user's workload from the local resources of the first user endpoint client device to the cloud-based resources, the orchestration service is further executed by the processing device to initiate migration of the first user's workload from a local instance of the workload running on the first user endpoint client device to a cloud instance of the workload by:
- sending a request to the first user endpoint client device to hibernate the local instance of the workload running on the first user endpoint client device;
- receiving context data pertaining to the hibernated local instance of the workload running on the first user endpoint client device from the first user endpoint client device; and
- sending a message containing the context data to at least one of the cloud service providers, wherein the message instructs the at least one cloud service provider to initiate the cloud instance of the workload on the remote servers operated by the at least one cloud service provider using the context data pertaining to the hibernated local instance.

15. The system of claim 12, wherein each cloud service provider provides a plurality of different cloud instance types for running workloads on the remote servers operated by the cloud service provider, and wherein the cloud resource usage data received from the plurality of cloud service providers comprises a number of usage hours accumulated by the user and a corresponding cloud instance rate for each cloud instance type used by the user during the cloud computing service billing cycle.

16. The system of claim 15, wherein the orchestration service is executed by the processing device to determine a per-day user workload run-rate for the first user by:
- determining a per-day utilization of each cloud instance type by dividing the number of usage hours accumulated by the first user for each cloud instance type by a total number of days in the cloud computing service billing cycle;
- determining a per-day cost of each cloud instance type by multiplying the per-day utilization of each cloud instance type by the corresponding cloud instance rate; and
- determining the per-day user workload run-rate for the first user by combining the per-day cost of each cloud instance type used during the cloud computing service billing cycle.

17. The system of claim 12, wherein the orchestration service is executed by the processing device to determine the expected cloud resource usage by multiplying the per-day user workload run-rate for the first user by a total number of days in the cloud computing service billing cycle.

18. The system of claim 17, wherein the orchestration service executed by the processing device generates a trigger to migrate the first user's workload from the cloud-based resources to the local resources of the first user endpoint client device if the expected cloud resource usage is greater than a threshold value.

19. The system of claim 17, wherein the orchestration service executed by the processing device generates a trigger to migrate the first user's workload from the cloud-based resources to the local resources if the expected cloud resource usage is greater than, less than or equal to a threshold value and the first user persona is a lower tier user persona.

20. The system of claim 17, wherein the orchestration service executed by the processing device generates a trigger to migrate the first user's workload from the local resources of the first user endpoint client device to the cloud-based resources based on one or more rules, which are used by the orchestration service to reduce utilization of the local resources when the expected cloud resource usage is less than a threshold value.

21. The system of claim 10, where the telemetry data collected by the client agent executing on the first endpoint client device comprises at least one of:
- user data for the first user that includes at least one of calendar data of the first user, applications currently and previously used by the first user, or I/O devices used by the first user;
- performance data for the first user endpoint client device that includes at least one of general processor performance when running first user applications, or number of concurrently running applications;
- location data of the first user endpoint client device that includes at least one of GPS data for the first user endpoint client device, or a premise location where the first user endpoint client device is working; or
- network resource data for the first user endpoint client device that includes at least one of network access data indicating if the first user is using public Wi-Fi without authentication to access network resources, or is using home Wi-Fi or corporate Wi-Fi to access the network resources.

22. The system of claim 10, where the telemetry data collected by the client agent executing on the first endpoint client device comprises workload data for at least one client application on the first endpoint client device; and where the client agent is executed by a host programmable integrated circuit of the first endpoint client device to:

first collect initial workload data for the client application when the client application is initially installed on the first user endpoint client device, the initial workload data comprising at least one of container telemetry, new driver installations, registry entries, user settings, hardware resources accessed by the client application, geographic information, or client application version information; and then collect subsequent workload data for the client application when the client application is launched on the first user endpoint client device, the subsequent workload data comprising at least one of default user settings used by the first user when the client application is launched, hardware resources being accessed by the client application, read/write activity on a storage device, temporary storage location when the first user uses the client application and creates an artefact, I/O events, type of workload, or network access universal resource locator (URL) and/or network activity.

23. The system of claim 10, where the first user endpoint client device is a personal computer, tablet computer, or mobile device; and where the local instance of the workload is a client application executing on a host programmable integrated circuit of the first user endpoint client device.

24. The system of claim 10, where the orchestration service is executed by the processing device to handle first user session management during the workload migration, and/or to manage first user authorization and authentication during the workload migration to maintain the user session across cloud/local environments.

25. The computer-implemented method of claim 1, where the telemetry data collected by the client agent executing on the first endpoint client device comprises at least one of:

user data for the first user that includes at least one of calendar data of the first user, applications currently and previously used by the first user, or I/O devices used by the first user;

performance data for the first user endpoint client device that includes at least one of general processor performance when running first user applications, or number of concurrently running applications;

location data of the first user endpoint client device that includes at least one of GPS data for the first user endpoint client device, or a premise location where the first user endpoint client device is working; or network resource data for the first user endpoint client device that includes at least one of network access data indicating if the first user is using public Wi-Fi without authentication to access network resources, or is using home Wi-Fi or corporate Wi-Fi to access the network resources.

26. The computer-implemented method of claim 1, where the telemetry data collected by the client agent executing on the first endpoint client device comprises workload data for at least one client application on the first endpoint client device; and where the computer-implemented method further comprises:

first collecting initial workload data for the client application when the client application is initially installed on the first user endpoint client device, the initial workload data comprising at least one of container telemetry, new driver installations, registry entries, user settings, hardware resources accessed by the client application, geographic information, or client application version information; and then collecting subsequent workload data for the client application when the client application is launched on the first user endpoint client device, the subsequent workload data comprising at least one of default user settings used by the first user when the client application is launched, hardware resources being accessed by the client application, read/write activity on a storage device, temporary storage location when the first user uses the client application and creates an artefact, I/O events, type of workload, or network access universal resource locator (URL) and/or network activity.

27. The computer-implemented method of claim 1, where the first user endpoint client device is a personal computer, tablet computer, or mobile device; and where the local instance of the workload is a client application executing on a host programmable integrated circuit of the first user endpoint client device.

28. The computer-implemented method of claim 1, wherein if a trigger is generated to migrate the user's workload from the cloud-based resources to the local resources of the first user endpoint client device, the computer-implemented method further comprises handling first user session management during the workload migration, and/or managing first user authorization and authentication during the workload migration to maintain the user session across cloud/local environments.

* * * * *